United States Patent
van de Vaart et al.

[11] 3,863,497
[45] Feb. 4, 1975

[54] ACOUSTIC DELAY SURFACE WAVE MOTION TRANSDUCERS

[75] Inventors: Herman van de Vaart, Harvard; Hugh B. Matthews, Acton; James C. Worley, Sudbury, all of Mass.

[73] Assignee: Sperry Rand Corporation, New York, N.Y.

[22] Filed: Oct. 24, 1972

[21] Appl. No.: 300,034

[52] U.S. Cl................ 73/71.2, 73/67.5 R, 73/71.4, 73/141 A, 73/408, 73/517 R
[51] Int. Cl......................... G01h 1/00, G01p 15/00
[58] Field of Search............. 73/67.5 R, 67.6, 71.2, 73/71.4, 517 R, 408, 141 A

[56] References Cited
UNITED STATES PATENTS

| | | | |
|---|---|---|---|
| 2,865,196 | 12/1958 | Bordenave et al. | 73/67.6 X |
| 3,572,087 | 3/1971 | Parks | 73/67.6 X |
| 3,575,050 | 4/1971 | Lynnworth | 73/194 |
| 3,587,297 | 6/1971 | Kammer | 73/67.6 |

OTHER PUBLICATIONS

I. L. Gelles et al., Apparatus for Thin Sample Ultrasonic Measurements, The Review of Scientific Instruments, Vol. 37, No. 10, Oct. 1966, p. 1345–1349.

K. Yamanouchi et al., Elastic Surface-Wave Excitation, Using Parallel Line Electrodes Above Piezoelectric Plates, J.A.S.A., Vol. 41, No. 1, Jan. 1967, p. 222–223.

Primary Examiner—Richard C. Queisser
Assistant Examiner—John P. Beauchamp
Attorney, Agent, or Firm—Howard P. Terry

[57] ABSTRACT

Transducer device employing relative changes in the acoustic propagation characteristics of waves of the Rayleigh type flowing at a polished surface of a thin elastic member yield a measure of the degree of flexing of the elastic member, which latter may take the form, for instance, of a cantilever clamped at one end. Applications such as to strain or displacement gages and to accelerometers are provided.

18 Claims, 19 Drawing Figures

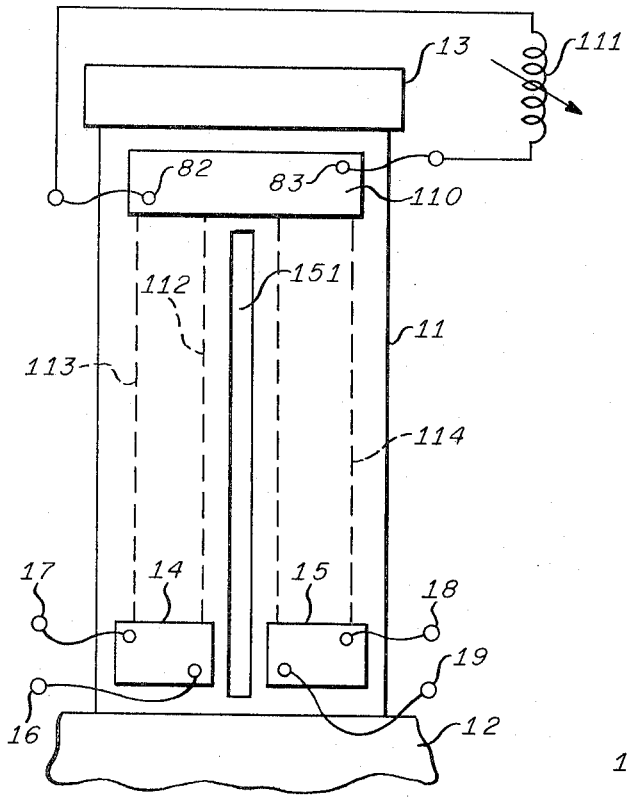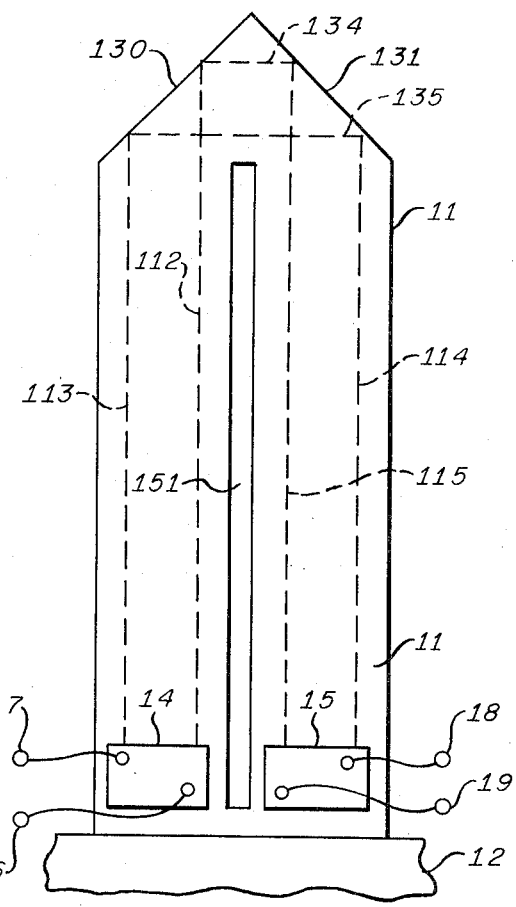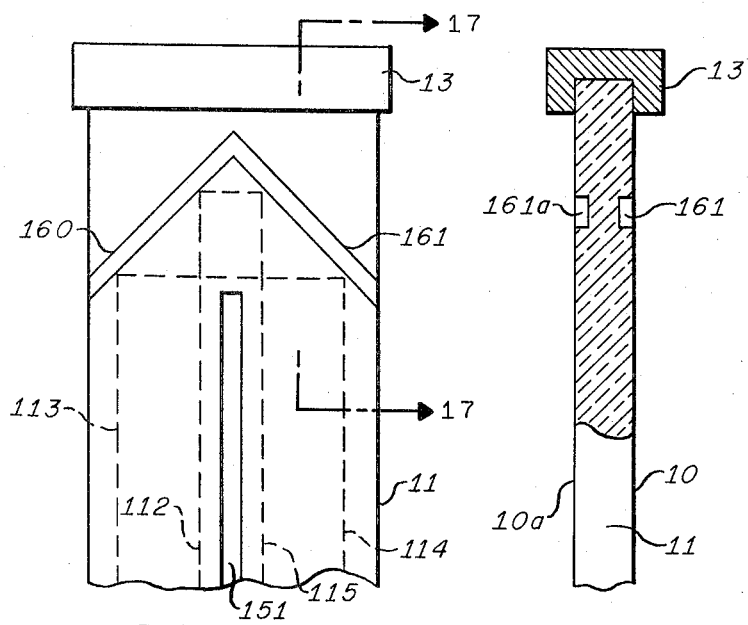

ACOUSTIC DELAY SURFACE WAVE MOTION TRANSDUCERS

BACKGROUND OF THE INVENTION

1. Field of the Invention

The invention pertains to sonic transducer devices employing surface acoustic waves and adpated to use in the measurement of strain, displacement, acceleration or related parameters and more particularly relates to transducers utilizing relative changes of the velocity and the length of sonic propagation of surface waves in flexible elements constitued of materials, for example, of the piezoelectric or ferroelectric kinds.

2. Description of the Prior Art

Generally, prior art accelerometer and other displacement of strain measuring devices encompass a wide variety of structures and principles. Each approach has been found to have its particular merits, but many defects are also present, such as lack of sensitivity and reliability on the one hand, and fragility and high cost on the other. Some accelerometer arrangements, for example, require expensive auxiliary equipment, such as feed back mechanisms for providing reliable calibration or constant temperature enclosures, for example. Many such prior art arrangements are inherently analog in nature and do not lend themselves directly to use in digital processors.

In an effort to develop improved transducer devices, attention has turned to semiconductor piezoelectric and piezoresistive devices and to other sensors beneficially employing techniques and discoveries attached to recent microcircuit and digital circuit developments. Such devices are liberally described in prior art. By way of example, the O.N. Tufte and D.Long paper "Recent Developments in Semiconductor Piezoresistive Devices," Solid State Electronics, 1963, Vol. 6, pages 323 to 338 may be mentioned as of general interest.

The Tufte et al paper describes a wide variety of piezoresistor transducers, including direct stress transducers of the kind employing a flexible cantilever clamped at one end to which acceleration or physically applied forces are directed at the unclamped end for flexing the cantilever. In these transducers, the basic structural member (the cantilever) does not contribute greatly to the sensitivity of the apparatus, but must transmit the stress to be measured to a more sensitive sensor element such as a piezoresistor affixed to a flexing surface of the cantilever. Measurement of current flow through such resistors yields a measure of strain of the cantilever. Such devices are, however, expensive and difficult to manufacture and strict controls must be exercised in order that the product be uniform. Since resistivity of an exposed resistor element is to be measured by measuring flow of electrical current through it, the devices are sensitive to ambient temperature and humidity conditions. Strict maintenance of calibration requires many special precautions. Furthermore, the devices are inherently analog in nature and are best suited for application when the associated display or other utilization device is an analog device. Such measurement devices generally demonstrate troublesome zero drift and scale factor drift with variations in temperature and in power supply voltage and may therefore demonstrate significant warm up drifts and continued instability after that initial period.

SUMMARY OF THE INVENTION

The present invention relates to strain, motion, or acceleration transducing devices employing surface propagating acoustic waves on flexible elements, such as waves of the Rayleigh type. Measurements are made of the relative changes in the time of propagation of the surface sonic wave as the flexible element is displaced by the forces to be measured.

BRIEF DESCRIPTION OF THE DRAWINGS

FIGS. 12 and 13 are plan views of preferred forms of the transducer in which acoustic driver and receiver elements are strategically located.

FIGS. 16 and 17 are partial elevation and side views of a portion of a transducer of a form alternative to that of FIGS 12 and 13.

FIG. 18 is a partial elevation view of apparatus for applying forces for flexing the transducer.

DESCRIPTION OF THE PREFERRED EMBODIMENTS

The motion transducer of the present invention employs changes in the propagation characteristics of acoustic waves flowing at the surface of a relatively thin elastic or flexure member to provide output signals yielding measures of the degree of flexure of the elastic member. Accordingly, the novel transducer may be used to detect relative motion between parts of the flexing elastic member, whether induced by direct acceleration of parts of the flexible member itself, or whether induced by directly communicated mechanical forces, as in conventional strain gauges or other such transducer devices.

Figure 1:
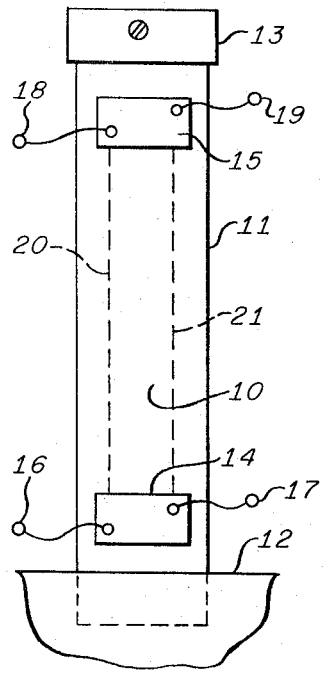
FIG. 1 is an elevation view of a preferred form of the transducer.
Figures 2, 3:
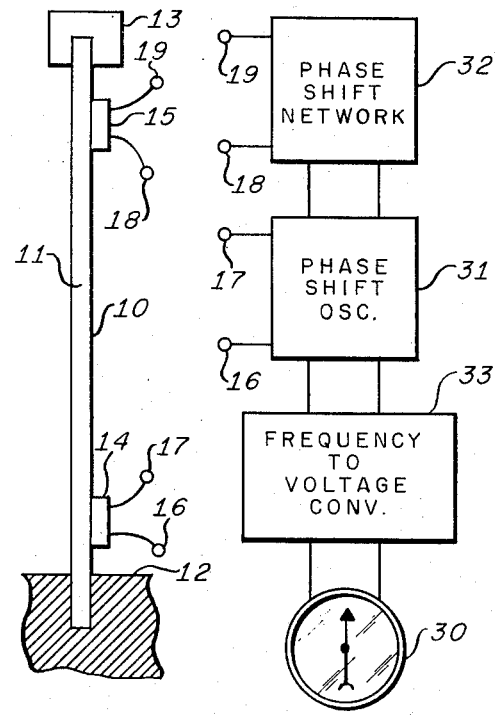
FIG. 2 is a side view of the transducer of FIG. 1.
FIG. 3 is a circuit diagram of one form of signal processing and display circuit generally useful with embodiments of the invention such as those of FIGS. 1 and 2.

As seen in FIGS. 1 and 2, the novel transducer may, for example, employ the propagation of surface elastic plane waves at a predetermined boundary surface 10 of a clamped elastic cantilever or flexure member 11. The cantilever flexure device 11 is clamped in a conventional manner within a base element 12. Cantilever 11 will normally have a thin cross section of elongate or rectangular shape, thus affording a preferred flexure direction and little sensitivity to forces applied at right angles to the thin dimension. Depending upon the selected design frequencies, when operated as an accelerometer, for instance, the cantilever may have a seismic mass 13 clamped at its end opposite base 12.

Waves of the Raleigh type may be used in the device; in Rayleigh waves, the particle motion at the boundary surface 10 is miniscule and retrograde elliptical; i.e., components of particle displacement exist both in the direction of energy propagation and normal to the boundary surface plane. The surface acoustic wave velocity is slightly less than the bulk elastic wave velocity often employed in prior art elastic transducer devices. The acoustic energy of the preferred wave flows almost entirely within a thin layer at surface 10 and is closely bound to that surface. The propagation velocity is substantially independent of the carrier frequency of the wave.

The surface acoustic waves are accompanied by synchronous alternating traveling electric and magnetic fields which extend somewhat into free space above the boundary surface 10. Quartz, piezoelectric semiconductors, and ferroelectric materials, as well as other materials, demonstrate such surface wave propagation.

Excitation of the running surface acoustic wave may be accomplished by generating a compatible running electric field wave at the surface boundary of the medium on which the surface waves are to propagate. Similarly, for magnetostrictive materials, the surface wave may be excited by presenting a time varying magnetic field at the boundary surface. Various methods of generation of such surface waves have been described in the literature. The same principles as are employed for exciting the waves may generally be used to convert the waves back into electrical signals, as will be seen. The surface waves preferably flow at a surface polished to the extent that defects are only a small fraction of a wave length in size.

In FIGS. 1 and 2, the element 14 represents an exciter for exciting acoustic surface waves flowing along the idealized path defined by dotted lines 20, 21 at the surface layer 10 of the transducer. An electrical driving signal applied to the flexible lead terminals 16, 17 is converted by exciter 14 into Rayleigh waves which may be collected by receiver element 15, wherein the acoustic signals are re-converted to electrical signals appearing at the flexible lead output terminals 18, 19.

It will be seen that, if the top of cantilever 11 is moved to the left in FIG. 2, the distance between exciter 14 and receiver 15 is increased; therefore, an increased time is taken for the acoustic signal to flow between elements 14 and 15. In addition, the velocity of sonic propagation is altered by the induced stress at the surface, all materials being elastically non-linear as indicated by their third order elastic constants. Whether the velocity change is positive or negative depends upon the sign of third order elastic constants. Conversely, if the top of cantilever 11 of FIG. 2 is moved to the right, the surface 10 of the cantilever is compressed and the distance between exciter 14 and receiver 15 is diminished. Therefore, the acoustic signal arrives at receiver 15 in a shorter time than in the previous situation. The velocity change in this case will be opposite to that of the first case. An alternating motion of the seismic mass 13 produces a signal at output terminals 18, 19 which is modulated in time in proportion to the vibration amplitude of the mass.

A measure of the deflection of cantilever 11 may be made in several ways. For example, if the apparatus of FIG. 3 is connected to flexible lead terminals 16, 17, 18, 19 of FIG. 2, an electrical meter or other display 30 may be used for display purposes. in FIG. 3, a conventional phase shift periodic oscillator or signal generator 31 having a conventional frequency determining phase shift network 32 is employed. The oscillation or carrier frequency of phase shift oscillator 31 is converted to a unidirectional voltage by frequency-to-voltage converter 33, that voltage being supplied to the display 30 for its operation. If the device is used as an accelerometer, meter 30 is arranged to display the amplitude of the modulating signal. In any event, the varying phase shift due to the changing length of the surface acoustic path 10 and changing velocity of surface propagation is added to the fixed phase shift provided by phase shift network 32 so as to vary the electrical frequency of oscillation of the system and hence the proportional deflection of the pointer of meter 30. Alternatively, converter 33 in FIG. 3 may be omitted, and cycles per unit of time may be displayed by a counter display 30 of conventional nature. It will be understood that meter 30 may equally well be replaced by other signal utilization apparatus.

Figure 4:
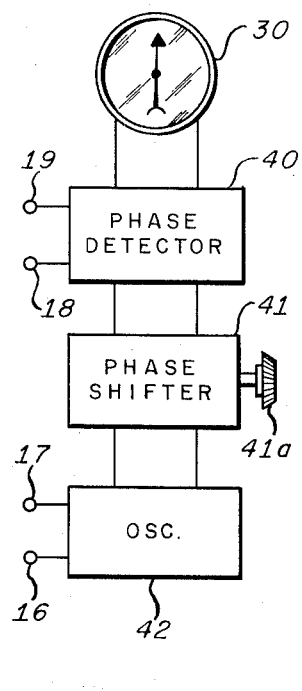
FIGS. 4 and 5 are circuits alternative to that of FIG. 3.

In the system of FIG. 4, phase shift, rather than frequency change is employed by meter or utilization device 30. Here, terminals 16, 17, 18, 19 are connected to the arrangement of FIG. 2, as before. Oscillator 42 supplies a carrier wave via terminals 16, 17 to exciter 14. The carrier acoustic wave, in traversing the surface path 10, has its phase varied upon arrival at receiver 15 if cantilever 11 is flexed. The phase of the electrical signal generated by receiver 15 is compared in signal processing circuit or phase detector 40 with the reference phase supplied by oscillator 42. Phase shifter 41, located between periodic oscillator 42 and phase detector 40, may be controlled by adjustment 41a for the calibration of the zero point of meter 30, which mether proportionally displays the phase shift variation. Meter 30 is such as to respond to the amplitude of unidirectional currents when the device of FIG. 4 is used simply to measure displacement, or to an alternating modulation signal when acceleration is to be displayed. Other utilization apparatus may be substituted for meter 30.

Figure 5:
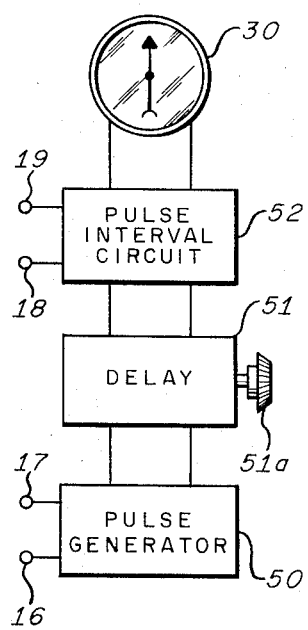

Pulse propagation delay or transit time may alternatively be measured, as in FIG. 5. With the flexible lead terminals 16, 17, 18, 19 coupled in FIG. 2 as before, a short pulse signal generator 50 is used to drive exciter 14 of FIG. 1. Depending upon the varying delay induced in the acoustic surface path 10 by flexure of cantilever 11, the transit time of the pulses between exciter 14 and receiver 15 will vary. To measure that variation, timing reference pulses may be supplied through the manually trimmable delay 51 to a pulse signal processing or interval measurement circuit 52, along with the pulse output of receiver 15. The varying interval or delay time between the two pulse trains may readily be displayed on meter 30 or otherwise employed. Many circuits suitable for use for performing the function of pulse interval measurement are available in the prior art, including decoder circuits developed for pulse interval coded communication receivers or for distance measurement. For example, the input pulses supplied to circuit 52 may readily be converted to sine waves within circuit 52 whose relative phases are then comparable by conventional phase comparator means.

The devices of FIGS. 1 and 2 are subject to thermal expansion and contraction as the ambient temperature changes, though temperature compensatory elements may be introduced into the circuits of FIGS. 3, 4, and 5 with good effect. For example, the respective controls 41a and 51a of FIGS. 4 and 5 may be adjusted by bimetal temperature sensors (not shown) in the conventional manner. Furthermore, the cantilever 11 may be made of a quartz bar of ST cut, which has substantially a zero temperature coefficient of velocity at room temperature.

Figure 6:
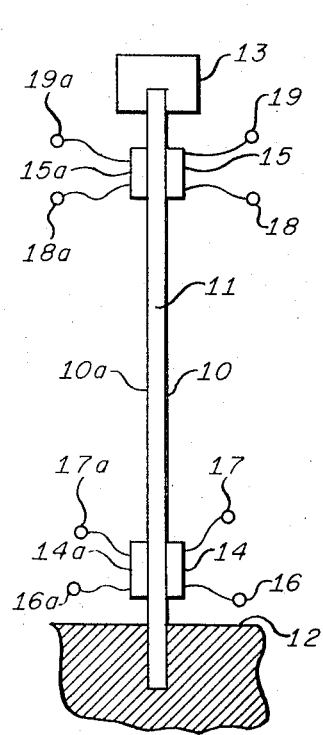
FIG. 6 is an elevation view of a preferred form of the transducer.

Alternatively, the arrangement of FIG. 6 may be employed, an arrangement inherently immune to ambient conditions when used with appropriate signal processing circuits. Paired surface wave paths 10, 10a are now formed on opposed sides of the flexure cantilever 11, path 10 being associated, as before, with exciter 14 and receiver 15 and path 10a with exciter 14a and receiver 15a. It will be seen that movement to the left of mass 13 causes path 10 to stretch while path 10a is compressed by a substantially equal amount, and vice versa. If the temperature of cantilever 11 changes, the respective at-rest distances or transit times between elements 14, 15 and 14a, 15a change substantially equally. If a signal processing circuit is used in which the effective total delays are subtracted one from the other, the spurious delays induced by temperature change are cancelled.

Figure 8:
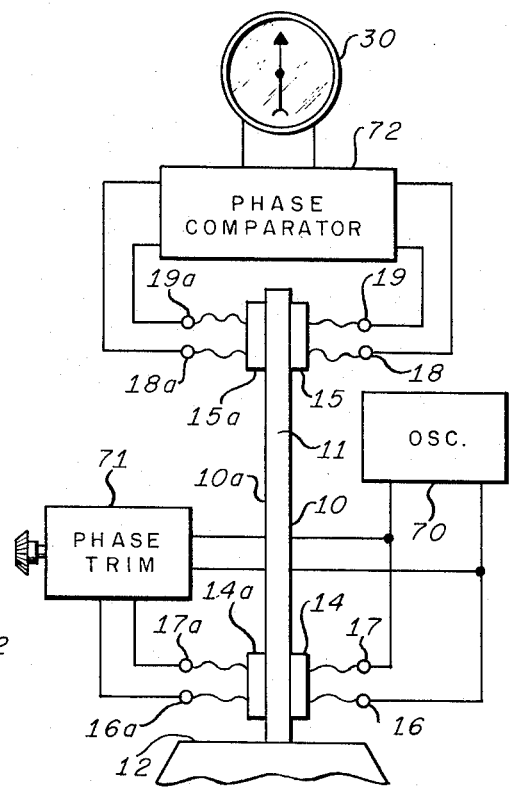
FIGS. 7 and 8 are circuit diagrams of signal processing circuits which may be used with forms of the transducer such as that shown in FIG. 6.
Figure 7:
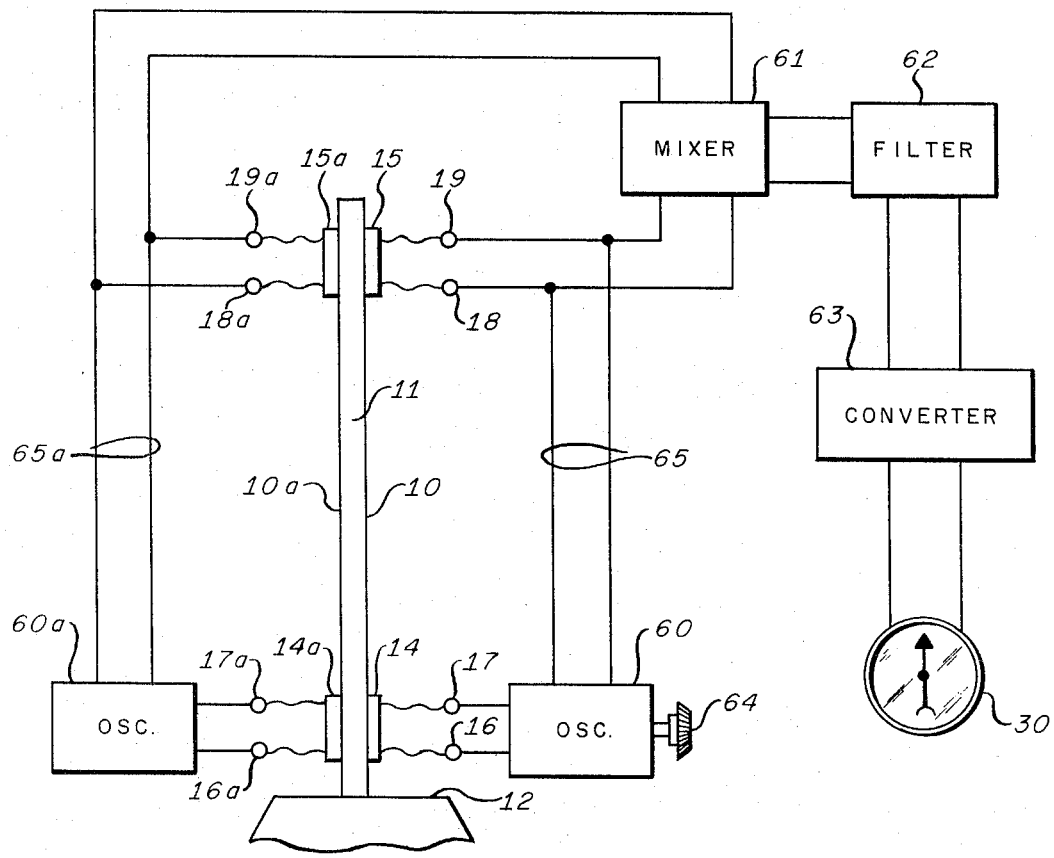

FIGS. 7 and 8 represent signal processing circuits for use with the arrangement of FIG. 6. In FIG. 7, a motion transducer corresponding to that of FIG. 6 is illustrated. Feed back oscillator 60 supplies exciter 14 with a carrier signal for generating a surface wave then picked up by receiver 15, whose electrical output is coupled to a conventional mixer circuit 61. The output of receiver 15 is also coupled via feed back leads 65 in frequency determining relation to an input of oscillator 60, whose inherent frequency of oscillation may also be adjusted by the trimming device 64. Because of the feed back connection 65, the carrier frequency of the signal supplied by receiver 15 to mixer 61 varies in a first sense.

The transducer of FIG. 7 is further equipped, as aforementioned, with an exciter 14a and receiver 15a associated with the second surface path 10a. Oscillator 60a is used to drive exciter 14a and the output of receiver 15a is coupled to a second input of mixer 61. As before, receiver 15a supplies a frequency-determining feed back via leads 65a to oscillator 60a. The frequency of the signal supplied by receiver 15a to mixer 61 varies in a second sense. Oscillator 60 may have its frequency adjusted so that there is never a zero frequency difference between the inputs to mixer 61, if desired, and a filter 62 may be used to eliminate any undesired side band in the output of mixer 62 when supplied to the conventional frequency-to-voltage converter 63. An output signal proportional to the amplitude of flexing of cantilever 11 is supplied by converter 63 to display or other utilization device 30, as before. Alternatively, converter 63 may be omitted and meter 30 will then comprise a conventional meter counting cycles per unit of time.

The circuit of FIG. 8, like circuits which are variants of the circuits of FIGS. 3, 4, and 5, may be used with the transducer of FIG. 6 in place of the circuit of FIG. 7. In FIG. 8, a single periodic oscillator 70 is used to drive both of the opposed exciter devices 14, 14a. Exciter 14 may be driven directly, while exciter 14a may be driven through the adjustable phase trimmer 71. The electrical outputs of receivers 15, 15a are supplied to the input terminals of a conventional phase comparator 72 whose output, in turn, is fed as before to a suitable display device or utilization device 30. It is seen that changes in length of cantilever 11 caused by temperature changes equally affect the phases of the outputs of receivers 15, 15a, and that the consequent effects of temperature variation are cancelled by the operation of phase comparator 72.

Figures 9, 10:
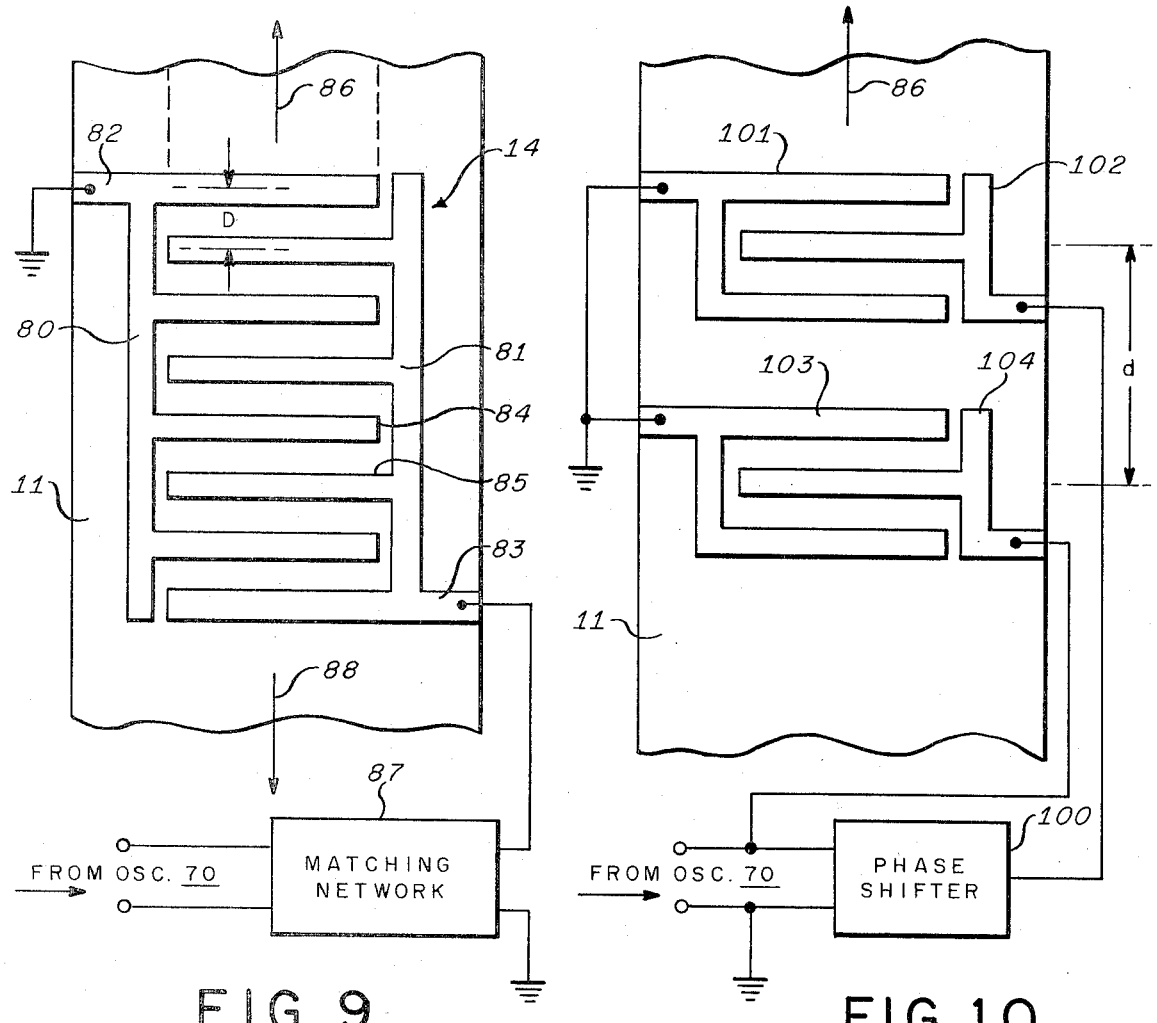
FIGS. 9 and 10 are elevation views of acoustic driver and receiver devices which may be used in transducers such as those in FIGS. 1, 2, 6, 7, and 8.

While several types of surface wave exciters and receivers are available in the prior art, arrangements which may be used are illustrated in FIGS. 9 and 10 by way of example. One preferred form of the surface wave excitation means is illustrated in FIG. 9. The device consists of a pair of electrodes 80, 81 with respective interdigital fingers of alternating instantaneous polarity, such as the respective fingers 84, 85. Standard photoetching and photoresist masking or other techniques may be used to fabricate the thin conductors of the interdigital electrodes 80, 81, which electrodes may be made of aluminum or other electrically conducting material, and may have widths of the order of microns. Adjacent fingers of any one electrode, such as fingers 84 of electrode 80, are spaced substantially one wave length apart at the operating carrier frequency. The electrode device 80, 81 acts as an end fire array, propagating the desired forward surface wave in the direction indicated by arrow 86 when driven by signals passing through a conventional matching network 87 from an oscillator such as oscillator 70 of FIG. 8.

Where generation of an undesired reverse wave as indicated by arrow 88 may not be tolerated, this wave energy may be absorbed in a convenient acoustically matched absorber. For example, an end layer of conventional acoustic absorbing material, such as wax or rubber or dielectric tape may be used. Since the major portion of the acoustic energy in the surface wave is bound to a layer including the surface 10 and the substrate to a depth of about one wave length below surface 10, the surface wave may be absorbed, for instance, by milling or otherwise forming transverse slots 90, 90a in the respective opposite propagation surfaces 10, 10a between the exciters and the base 12, and by filling the slots with acoustic absorbers 92, 92a composed of wax, rubber, or other suitable material. Slots 90, 90a are grossly exaggerated in size merely for convenience in illustrating them clearly.

An advantage of the construction is that the surface wave exciter launches surface waves traveling only away from the clamped support region at base 12, and the nature of that region has substantially no effect on wave propagation, substantially no echoes being produced.

Since the law of reciprocity evidently applies to the exciter 14 of FIG. 9, a similarly constructed electrode system may act as a receiver 15, coupling to the traveling electric field associated with the surface elastic wave, and thereby yielding a useful electrical output for signal processing.

The interdigital electrodes in FIG. 9 may be connected to cooperating circuits by fine gold wires fastened by standard thermocompression techniques to the electrodes at points 82, 83 or by solder. The exciter and receiver elements may be shielded, if desired, by small shields (not shown) designed to reduce mutual electromagnetic coupling between input and output electrodes.

In operation, the exciter electrode system 14 of FIG. 9, for example, interacts with the quartz, lithium niobate, bismuth germanium oxide, bismuth germanate, or lithium germanate substrate that forms the cantilever 11, producing the two oppositely running surface acoustic waves 86, 88 flowing at right angles to the electrode fingers 84, 85. Adjacent fingers of electrodes 80, 81 are preferable spaced apart by an integral number of half wave lengths. The traveling wave is successively amplified as it passes under each pair of electrode fingers. The receiver electrode system 15 is similarly constituted and operates in the reverse sense to re-convert the acoustic wave into a delayed electrical output signal. In both cases, it is preferred in the interest of efficiency to space the electrode fingers so that the condition of acoustic synchronism obtains, the traveling electric field at the exciter, for example, having the same periodicity as the electric field normally bound to the acoustic wave. For this condition, D in FIG. 9 is one half wave length.

FIG. 10 illustrates an alternative interdigital electrode array suitable for use as an exciter 14 (or receiver 15) for producing only the desired forward wave 86. It comprises a set of paired electrode systems, a first system again composed of interdigital electrodes 101, 102 like electrodes 80, 81 of FIG. 9, and a second similar cooperating electrode system 103, 104. Electrode system 103, 104 is driven directly by oscillator 70, while electrode system 101, 102 uses the signal from oscillator 70 after subjection to a phase shift by the trimmer phase shifter 100. The center-to-center distance $d$ is preferably effectively an integer plus one quarter wave length. With proper adjustment of phase shifter 100, this spacing prevents undesired reverse flow radiation. It is again seen that the device of FIG. 10 operates equally well as an acoustic wave exciter or receiver.

The configurations of the invention thus far discussed have in common an attribute that is disadvantageous in some applications; either the exciter or receiver element must be located at a movable end of the flexible element 11, making necessary the use at that end of flexible leads such as the leads of terminals 18, 19 in FIGS. 1 and 2. The arrangements of FIGS. 13 through 17, for example have the advantage that both the exciter and receiver electrode systems are located at the clamped end of the flexure member or cantilever 11. Thus, there are present no electrical connections at the free end of the cantilever 11 which might adversely damp or otherwise affect operation of the invention, for example, as an accelerometer. An acoustic reflector 110 is placed adjacent the free end of the cantilever 11, the exciter and receiver elements 14 and 15 being disposed side-by-side near the base 12 of the device. The surface wave bounded by dotted lines 112 and 113 generated by exciter 14 is reflected back by reflector 110 into receiver 15.

One of the several forms which reflector 110 may take is similar to that of the interdigital electrode structure 80, 81 of FIG. 9, the electrodes extending substantially across the entire width of the wave propagating surface 10 (note that the exciter and receiver electrode systems 14 and 15 in FIG. 12 occupy less than half of that dimension). The electrode structure 80, 81 acts as a reflector when an inductance 111 is connected across its terminals 82, 83 and is adjusted to resonate the effective capacitance of the electrode system. Inductor 111 may form the major portion of seismic mass 13. However, the acoustic wave energy, which is transmitted over the path generally defined by dotted lines 112, 113, is reflected generally over the whole of the region bounded by dotted lines 113, 114, a relatively inefficient process in some applications since part of the reflected wave is not coupled to receiver 15.

In the alternative form shown in FIG. 13, the exciter 14 and receiver 15 are again located proximate base 12 and distinct paths indicated by dotted lines 112, 113 and 114, 115 are provided for the sonic waves. A 90° acoustic wave reflecting roof prism is formed at the free end of cantilever 11 by surface portions 130, 131. The surface 130 reflects wave path 112, 113 so that it passes horizontally across the active surface 10 in wave path 134, 135 to form after reflection from surface 131 the separated return path 114, 115.

In FIG. 13 and in FIG. 16 which yet remains to be discussed, the isolation between wave paths 112, 113, and 114, 115 is further enhanced. While the exciter 14 and receiver 15 seen in FIG. 13 have in themselves inherent directional characteristics, the surface waves propagated on the cantilever surface 10 may be further confined, if desired, by the inclusion as in FIG. 14 on the boundary surface 10 of separated and opposed pairs of relatively thin longitudinal strip layers, such as layers 140, 141, 142 of a material such as a plastic whose surface wave propagation constants are such that the surface wave phase velocity is increased therein. As a consequence, spreading of the traveling surface wave is largely eliminated and one wave is confined to the surface 10 between the strip layers 140 and 141 and the return wave is confined between the strip layers 141 and 142. Longitudinal slots such as the slots 150, 151, 152, cast or otherwise formed in the surface 10 to a depth of about one wave length, also facilitate the desired isolation. A single median slot 151 may be conveniently employed, as seen in FIGS. 12, 13, and 16. The thickness of layers 140, 141, 142 and the depth of slots 150, 151, 152 are grossly exaggerated in the figures merely for the sake of clarity.

The configuration of FIGS. 16 and 17 is an alternative to those of FIGS. 12 and 13 and is representative of arrangements allowing convenient attachment of a seismic mass 13 to the free end of cantilever 11. A vee-shaped 90° system of slots or surface discontinuities comprising first and second slot portions 160, 161 is formed in the active surface 10 of cantilever 11. The acoustic wave again follows a pattern of paths like that of FIG. 13. Efficiency may be increased by employing a plurality of such vee-shaped slot reflectors lying in properly spaced relation in side-by-side array fashion. Slots 160, 161 may be made in generally the same manner as the guiding slot 151, may be rectangular in cross section, or may take other shapes, such as half circles. Surface discontinuities of convenient shape may be formed by scribing, by operation of a laser beam, or by the use of conventional photoresist and etching steps.

It will be understood by those skilled in the art that the invention may be employed as an accelerometer device for operating displays or for providing acceleration-proportional electrical signals to other utilization equipment. While the seismic mass 13 in FIGS. 16, 17, for example, is shown as a seismic mass for use with the device as an accelerometer, the device may also be used as in FIG. 18 to derive an electrical control signal proportional to the amplitude of any parameter susceptible of being converted into lineal motion, such as of a rod 171 seated in end piece 170 in bearing 172. Thus, deflection of a pressure diaphragm may be converted into translation of rod 171 for flexing of cantilever 11, as before.

Figures 11, 14, 15, 19:
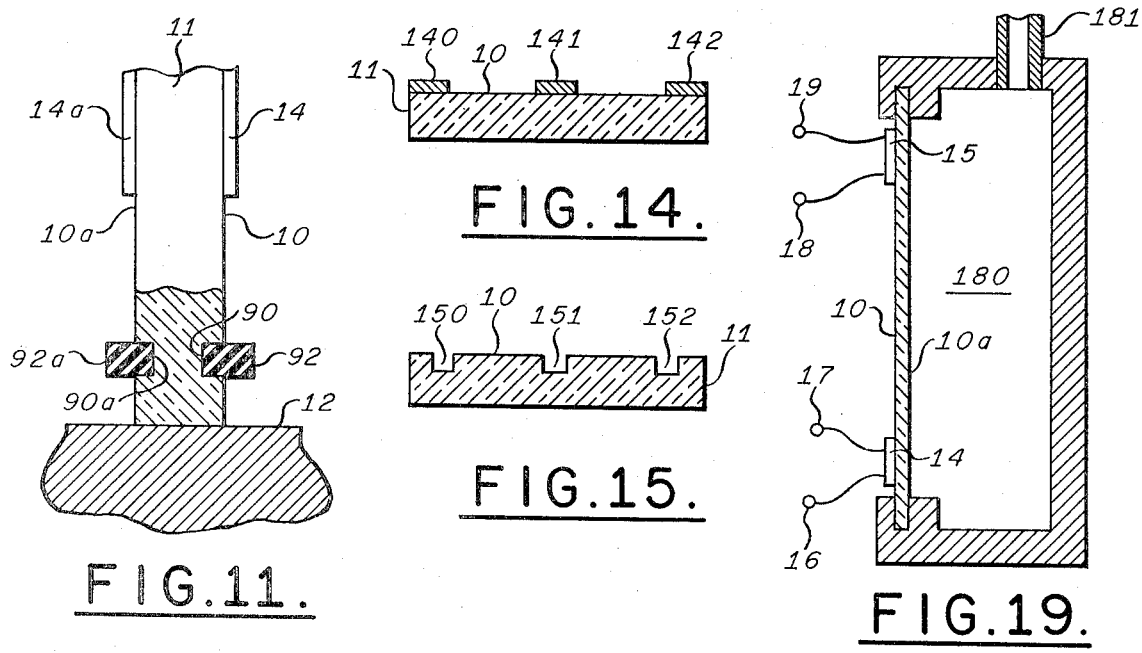
FIG. 11 is a view, partly in cross section, of a detail of an absorber structure which may be used in the apparatus of FIGS. 7 or 8.
FIGS. 14 and 15 are cross section views of wave guiding structures which may be used in the several transducer embodiments, as in FIGS. 12 and 13.
FIG. 19 is a cross section view showing application of the novel transducer to a pressure sensing diaphragm.

The invention may be used with flexible elements other than cantilevers clamped at one end, such as on the active surface 10 of a flexible diaphragm 185 clamped at its peripheral edge in a pressure cavity or vessel 180 for measurement of a varying pressure supplied thereto by input tube 181, such as shown in FIG. 19. The exciter and receiver elements 14, 15 operate as before.

It will be understood by those skilled in the art that the physical geometries and dimensions suggested by the several figures are generally representative, but that the figures are proportioned for the purpose of clearly illustrating the principles of the invention in its various embodiments, and do not in themselves necessarily represent proportions or dimensions which would be used in actual practice.

It is seen that the invention is a sonic transducer device employing surface acoustic waves that is adapted to use in the measurement of acceleration, strain, or related parameters. Relative changes in propagation path and propagation velocity of Raleigh waves flowing at single or at paired flexed surfaces may be measured in an arrangement which is compact, light, accurate, and reliable. Inherently, the novel transducer in its several embodiments is highly sensitive, though relatively immune to ambient conditions. The transducers have little zero drift or scale factor drift sensitivity to temperature, humidity, and power supply variations. In the several embodiments of the invention comparing times of transit along paired paths, maximum freedom from such prior art defects is offered. While the polished surfaces for the paired paths require considerable, though easily attainable, freedom from defects, there is no need that they actually approach optical flatness, nor that the surfaces be accurately parallel. In fact, the width between the surfaces 10, 10a in FIG. 6, for instance, may be tapered where such a taper is mechanically desirable. The novel transducers may be used to measure acceleration or as strain or displacement gauges and, since they provide a frequency or digital output, they avoid noise and drift problems inherent in purely analog devices and are easily interfaced with digital signal processors.

While the invention has been described in its preferred embodiments, it is to be understood that the words which have been used are words of description rather than of limitation and that changes may be made within the purview of the appended claims without departing from the true scope and spirit of the invention in its broader aspects.

We claim:

1. Transducer means comprising:
   elongate cantilever flexure means having first and second ends and a flexible surface layer adapted to propagate acoustic waves,
   exciter means for exciting and propagating said acoustic waves along a predetermined path at said flexible surface layer,
   receiver means along said path for receiving and converting said acoustic waves into electrical signals,
   signal generator means for driving said exciter means, and
   signal processing circuit means responsive to said signal generator means and to said receiver means for deriving a measure of the flexure of said flexure means.

2. Apparatus as described in claim 1 wherein said first end is clamped with respect to base means.

3. Apparatus as described in claim 2 wherein said second end is free to move substantially at right angles to said elongate cantilever means, said end having one degree of freedom of motion.

4. Apparatus as described in claim 3 wherein said second end has seismic mass means affixed thereto.

5. Apparatus as described in claim 2 wherein said exciter means is disposed on said surface layer at said first end adjacent said base means.

6. Apparatus as described in claim 2 wherein said receiver means is disposed on said surface layer means at said second end.

7. Apparatus as described in claim 1 wherein:
   said signal generator means comprises periodic wave oscillator means,
   said signal processing circuit means comprises phase shift circuit means for determining the normal frequency of oscillation of said periodic wave oscillator means, and
   said phase shift circuit means is responsive to said receiver means for varying the frequency of said periodic wave oscillator means.

8. Apparatus as described in claim 1 wherein:
   said signal generator means comprises periodic wave oscillator means, and
   said signal processing circuit means comprises phase detector means responsive to said periodic wave oscillator means and to said receiver means.

9. Apparatus as described in claim 1 wherein:
   said signal generator means comprises pulse generator means, and
   said signal processing circuit means comprises pulse interval detection means responsive to said pulse generator means and to said receiver means.

10. Apparatus as described in claim 1 wherein:
    said exciter means comprises first and second cooperative digital electrode means disposed in interdigital surface wave generating relation at said flexible surface layer,
    said electrode means having parallel digital fingers disposed in parallel array relation at right angles to said predetermined path.

11. Apparatus as described in claim 1 wherein:
    said receiver means comprises first and second cooperative digital electrode means disposed in interdigital surface wave receiving relation at said flexible surface layer,
    said electrode means having parallel digital fingers disposed in parallel array relation at right angles to said predetermined path.

12. Apparatus as described in claim 1 additionally including:
    reflector means at said flexible surface layer at said second end,
    said exciter means and said receiver means being disposed in side-by-side relation at said flexible surface layer means at said first end,
    said reflector means causing acoustic waves propagated by said exciter means toward it to be redirected for conversion within said receiver means.

13. Apparatus as described in claim 12 wherein said reflector means comprises discontinuity means penetrating at least a major fraction of one wave length into said flexible surface layer at the carrier frequency of said acoustic wave.

14. Apparatus as described in claim 12 wherein:
said reflector means comprises vee-shaped discontinuity means having first and second portions,
said first portion causing said acoustic waves to be directed toward said second portion, and
said second portion causing said acoustic waves to be directed toward said exciter means.

15. Transducer means comprising:
elongate cantilever flexure means having a flexible surface layer adapted to propagate acoustic waves and having first and second ends,
exciter means for exciting and propagating said acoustic waves along a predetermined path at said flexible surface layer,
receiver means along said path for receiving and converting said acoustic waves into electrical signals,
signal generator means for driving said exciter means, and
signal processing circuit means responsive to said signal generator means and to said receiver means for deriving a measure of the flexure of said flexure means, said flexure means being composed of quartz so cut as to demonstrate a substantially zero temperature coefficient of surface wave propagation velocity at room temperature.

16. Transducer means comprising:
cantilever flexure means having first and second opposed flexible surface layer means for separately propagating respective acoustic waves along first and second respective predetermined paths therein,
first and second exciter means for exciting and propagating said respective acoustic waves along said respective predetermined paths,
first and second receiver means along said respective predetermined paths for receiving and converting said acoustic waves into electric signals,
signal generator means comprising first and second feed back oscillator means respectively in feed back relation with said respective first and second receiver means for independently driving said respective first and second exciter means, and
signal processing circuit means responsive to said signal generator means and to said first and second receiver means for deriving a measure of the flexure of said flexure means.

17. Apparatus as described in claim 16 further including mixer means responsive to said first and second receiver means.

18. Transducer means comprising:
flexure diaphram means forming a wall of a pressure vessel and having a flexible surface layer adapted to propagate acoustic waves,
exciter means for exciting and propagating said acoustic waves along a predetermined path at said flexible surface layer,
receiver means along said path for receiving and converting said acoustic waves into electrical signals,
signal generator means for driving said exciter means, and
signal processing circuit means responsive to said signal generator means and to said receiver means for deriving a measure of the flexure of said flexure diaphram means.

* * * * *